(12) United States Patent
Chen et al.

(10) Patent No.: US 6,416,077 B1
(45) Date of Patent: Jul. 9, 2002

(54) COLLAPSIBLE STROLLER

(75) Inventors: Er-Jui Chen, Kaohsiung; Chuan-Tso Tai, Chia-I Hsien, both of (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 09/706,793

(22) Filed: Nov. 7, 2000

(51) Int. Cl.[7] .............................................. B62B 1/00
(52) U.S. Cl. ................. 280/642; 280/47.38; 403/93; 403/102; 74/523; 74/527; 74/528
(58) Field of Search ................. 280/642, 647, 280/650, 641, 658, 47.38, 655; 403/93, 97, 101, 102, 104; 74/523, 527, 528

(56) References Cited

U.S. PATENT DOCUMENTS

| | | | | | |
|---|---|---|---|---|---|
| 2,758,847 A | * | 8/1956 | Shone | ........................ | 280/642 |
| 2,798,730 A | * | 7/1957 | Smith | ........................ | 280/642 |
| 3,084,949 A | * | 4/1963 | Forster | ........................ | 280/642 |
| 3,184,249 A | * | 5/1965 | Shone | ........................ | 280/642 |
| 3,550,998 A | * | 12/1970 | Boudreau et al. | ........ | 280/47.38 |
| 4,216,974 A | * | 8/1980 | Kassai | ........................ | 280/42 |
| 5,876,057 A | * | 3/1999 | Huang | ........................ | 280/642 |
| 6,086,086 A | * | 7/2000 | Hanson et al. | ............. | 280/650 |
| 6,267,405 B1 | * | 7/2001 | Chen | ........................ | 280/647 |
| 6,299,194 B1 | * | 10/2001 | Chen | ........................ | 280/642 |

\* cited by examiner

*Primary Examiner*—Brian L. Johnson
*Assistant Examiner*—Bryan Fischmann
(74) *Attorney, Agent, or Firm*—Birch, Stewart, Kolasch & Birch, LLP (57) ABSTRACT

A collapsible stroller having simplified components is provided. Each sub-frame is substantially a triangle having a latch mounted on a third side and a cooperating mechanism. The third side tube is foldable at the latch, thus causing a second side tube to fold toward the first side tube. It is possible to obtain a flat collapsed stroller by a simple collapsing operation.

21 Claims, 7 Drawing Sheets

FIG. 6 ent means) which is slidably put on upper tube 501. As such, a user may only pull trigger member 72 upward to cause locking device 70 to move out of engagement with latch 60 for collapsing the stroller.

COLLAPSIBLE STROLLER

BACKGROUND OF THE INVENTION

1. Field of Invention

The present invention relates to strollers and more particularly to a collapsible stroller having simplified components such that a more flat shape may be obtained by a simple collapsing operation.

2. Related Art

Figure 1:
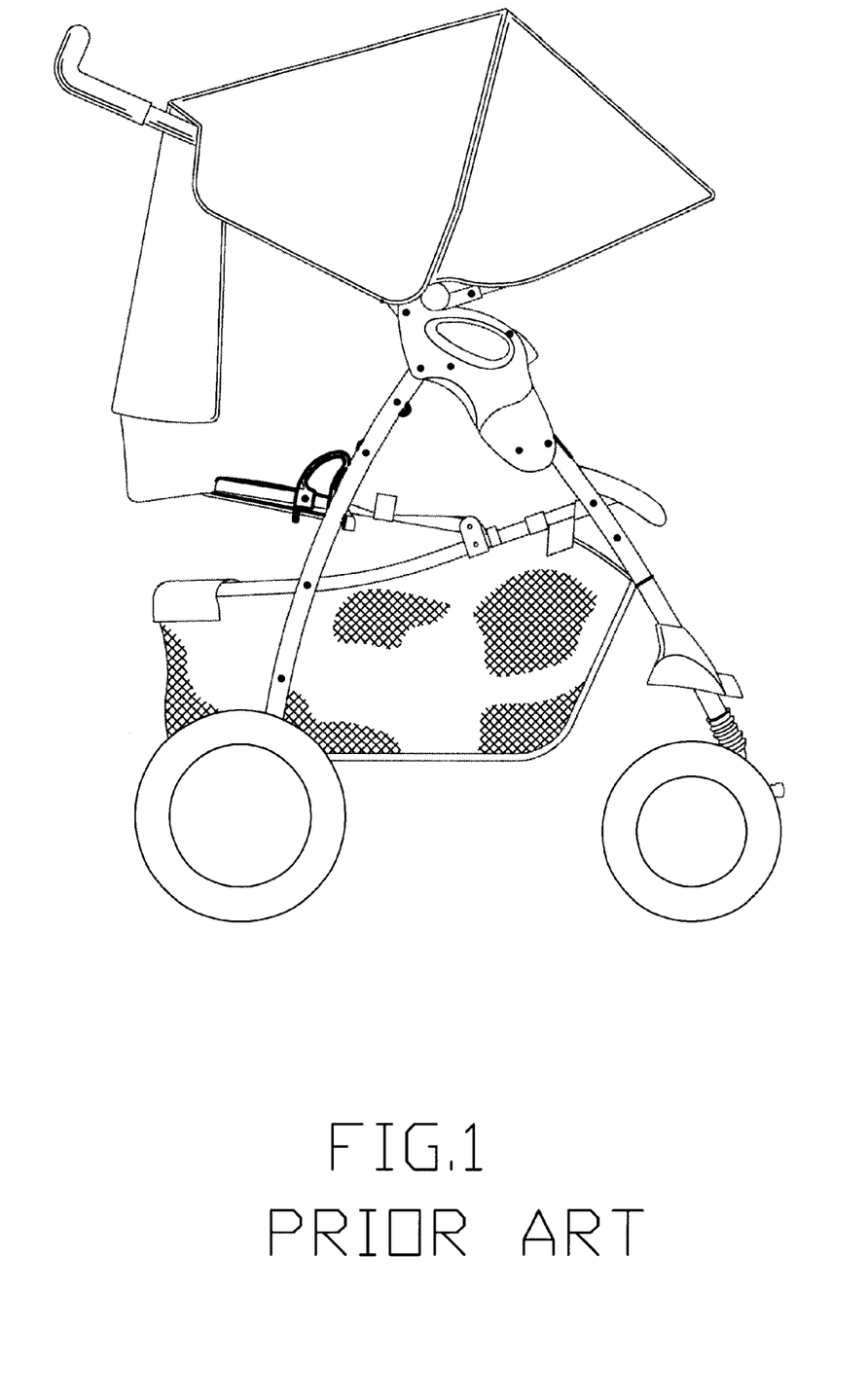
FIG. 1 is a side view of a conventional collapsible stroller.
Figure 2:
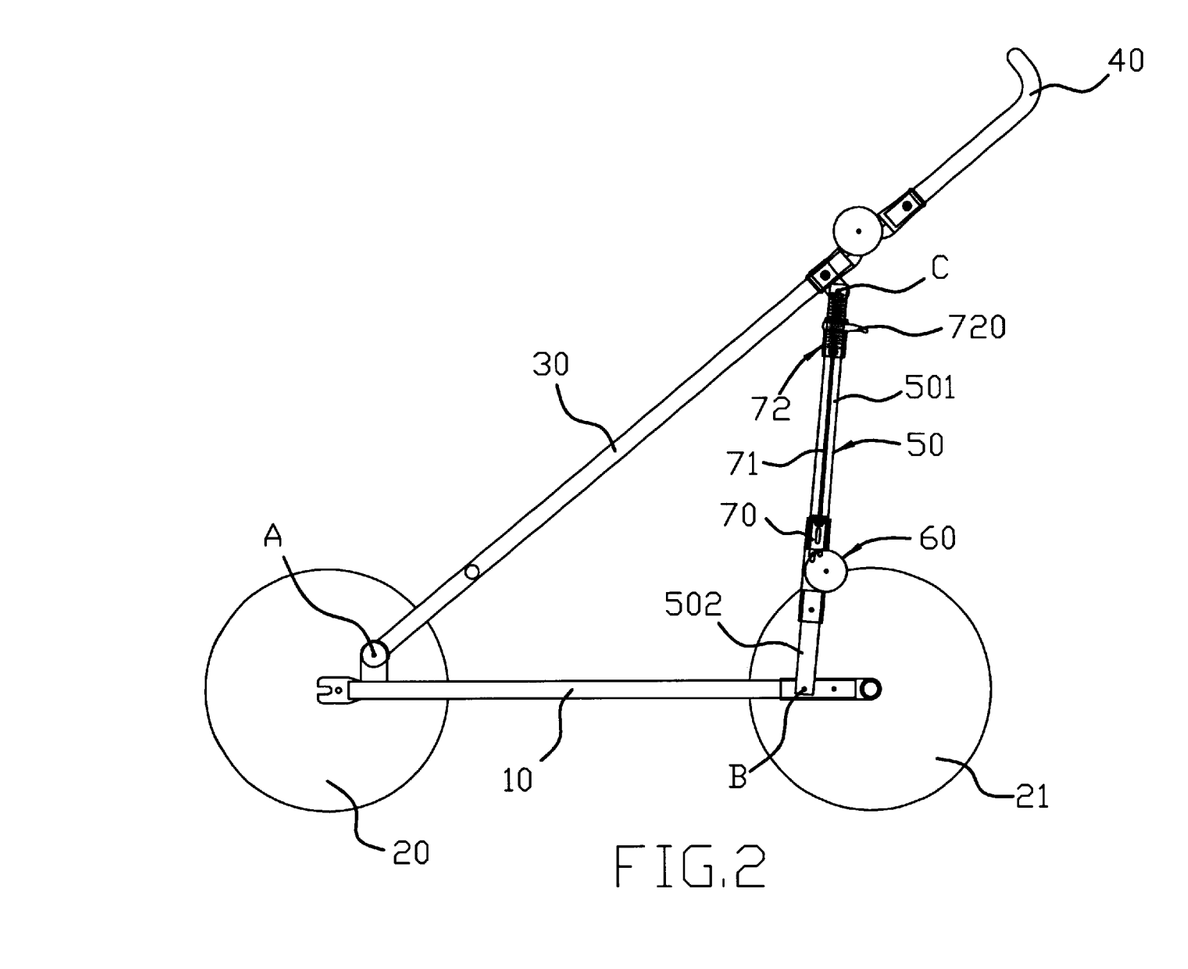
FIG. 2 is a schematic side view of the frame of a first preferred embodiment of collapsible stroller according to the invention.

Infant strollers have been widely used for many years to provide a convenient transportability. Also, there are a variety of strollers. For example, there are one for two infants to sit in tandem, cart-like stroller for facilitating shopping while taking an infant out, and jogging stroller equipped with two large rear wheels and a small front wheel, jogging stroller being easy to manipulate such that it is suitable for an adult to jog while pushing it. Conventionally, most of these strollers are made collapsible such that it may occupy a relatively small space for ease of transporting and storing. FIG. 1 illustrates a conventional collapsible stroller in an unfolded use state. Such collapsible stroller comprises a frame consisting of a plurality of tubes (e.g., metal tubes) wherein most tubes are pivotally interconnected such that one tube may pivot about the other. As a result, the purpose of folding the stroller into a collapsed state is achieved.

However, the previous design suffered from several disadvantages. For example, it is still bulky after being collapsed. Further, some collapsible strollers are designed to fold toward a point. As such, such strollers are formed as one having a heavy head and a light tail after being collapsed. In other words, a collapsed stroller does not have a uniform shape which is not convenient for carrying or storing.

Thus, it is desirable to provide an improved collapsible stroller in order to overcome the above drawbacks of prior art.

SUMMARY OF THE INVENTION

It is therefore an object of the present invention to provide a collapsible stroller having simplified components such that a more flat shape may be obtained by a simple collapsing operation. It is convenient for carrying or storing.

The advantages of the present invention are realized by providing a collapsible stroller wherein the frame consists of a plurality of tubes. Frame is comprised of a left sub-frame and a right sub-frame each being substantially a triangle. Each side of the triangle is formed of a tube. These tubes are pivotally connected to each other at each corner of the frame triangle. A latch is mounted on third side tube. The third side tube is foldable at the latch, thus causing second side tube to fold toward the first side tube. The collapsed stroller is substantially a straight piece with a minimum storage space.

In one aspect of the present invention a locking device is slidably provided on the third side tube adjacent the latch. Locking device is capable of moving into engagement with the latch or moving out of engagement with the latch. Also, a trigger member is slidably put on the third side tube being coupled to the locking device through a connecting member. The trigger member is operable to cause the locking device to move out of engagement with the latch so as to fold the stroller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Referring to FIGS. 2 to 5, there is shown a collapsible stroller constructed in accordance with the invention comprising a frame consisting of a plurality of tubes (e.g., steel or metal tubes) and associated components and a plurality of sets of wheels (e.g., four in this embodiment) rotatably mounted under the frame. Frame is comprised of a left sub-frame and an identical right sub-frame. As such, only the left sub-frame will now be described in detail below for the sake of brevity.

Figures 4A, 4B:
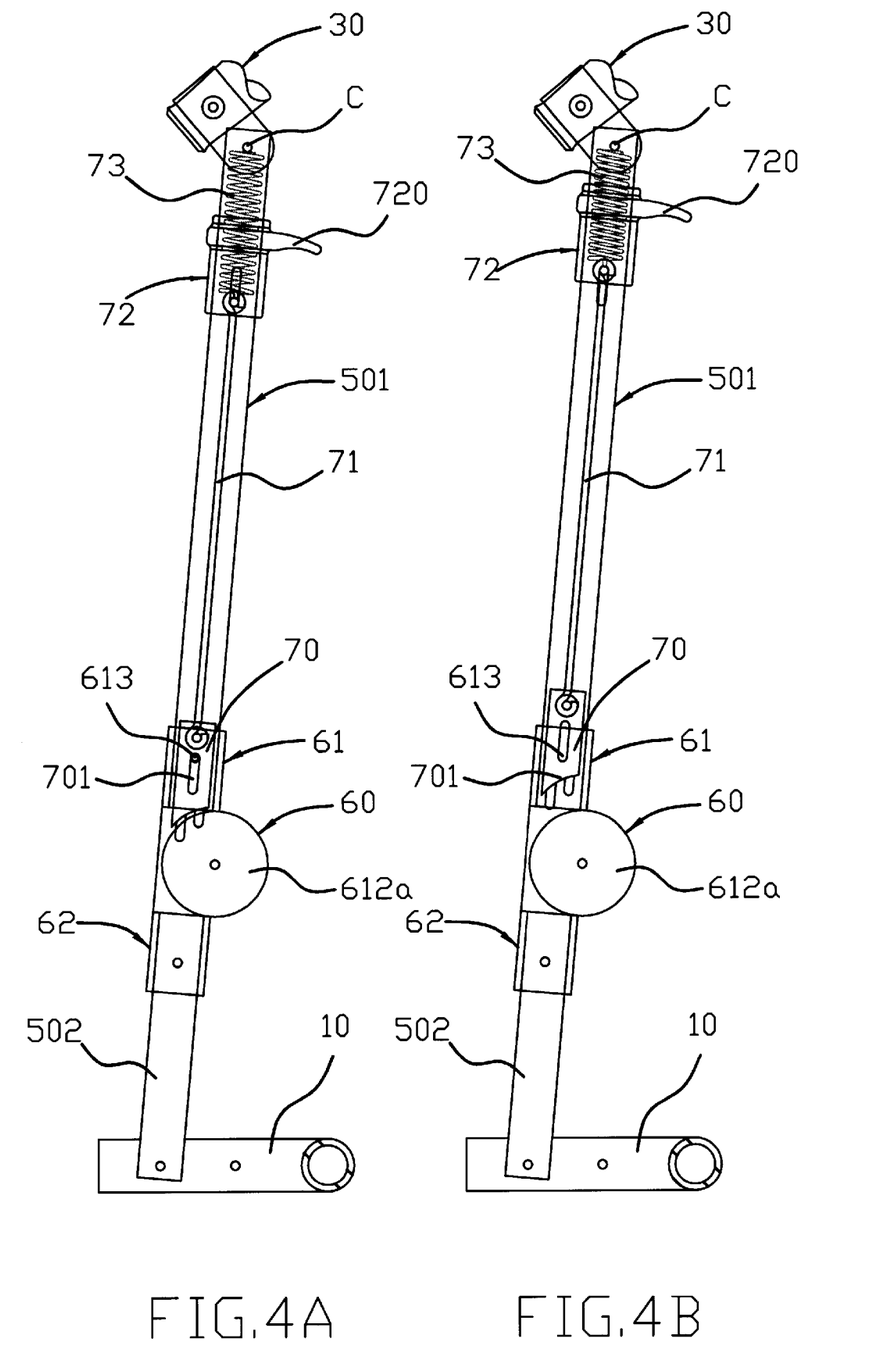
FIG. 4A schematically illustrates the operation of latch where latch being locked by locking device.
FIG. 4B is similar to FIG. 4A where latch being unlocked by locking device.
Figure 5:
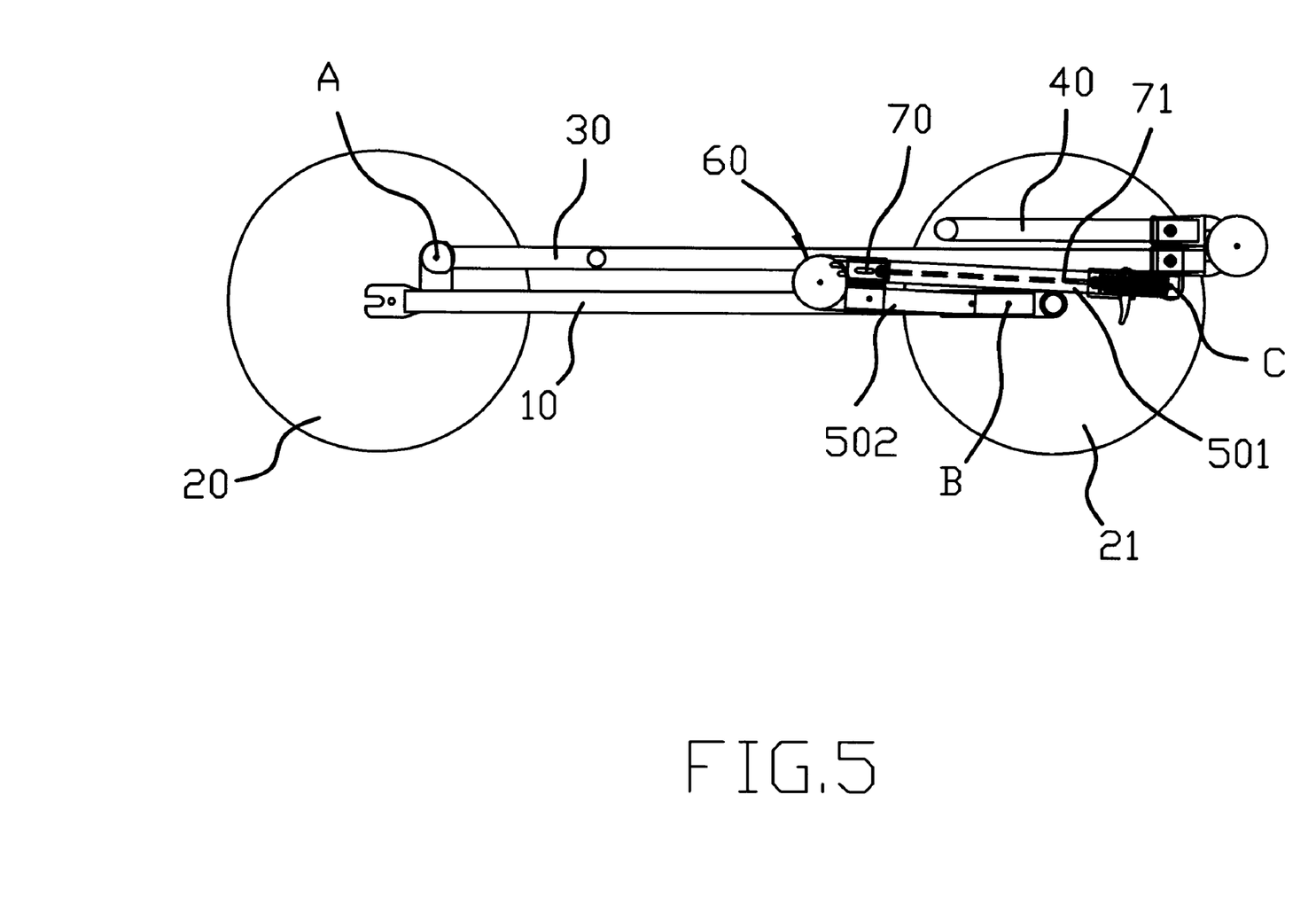
FIG. 5 schematically illustrates the collapsed FIG. 2 stroller.

Left sub-frame is substantially a triangle. Preferably, it is substantially a right-angled triangle as shown. As such, it is convenient to configure the required elements (e.g., seat and sunshade) of the stroller. Each side of the triangle is formed of a frame tube. Also, frame tubes are pivotally connected to each other at each corner of the frame triangle. These frame tubes comprise a first side tube (i.e., the horizontal side of the triangle) 10 with a front wheel assembly 20 and a rear wheel assembly 21 rotatably mounted thereunder, thus forming the base of stroller; a second side tube (i.e., the slanted side of the triangle) 30 having a lower end coupled at corner A and an upper end formed as handlebar 40; a third side tube (i.e., the verticle side of the triangle) 50 having a lower end coupled to first side tube 10 at corner B and an upper end coupled to second side tube 30 at corner C. The third side tube 50 is capable of being folded about latch 60 (as detailed below). Third side tube 50 comprises an upper tube 501 and a lower tube 502 pivotally coupled to upper tube 501 at latch 60. Upper tube 501 and lower tube 502 are aligned in an unfolded use position, while they are folded toward each other in a folded storage position (see FIG. 5). A sliding locking device 70 is provided on upper tube 501. Locking device 70 is slidable to move into engagement with latch 60 (FIG. 4A) or move out of engagement with latch 60 (FIG. 4B). Locking device 70 is coupled to trigger member 72 through a connecting member (e.g., steel cable or connecting rod) 71. In collapsing the stroller (i.e., moving stroller from the position of FIG. 4A to that of FIG. 4B), the trigger member 72 is first activated to pull connecting member 71 up for disengaging locking device 70 from latch 60. Then upper tube 501 is folded toward lower tube 502, thus causing second side tube 30 to fold toward first side tube 10 about corner A. Finally, all side tubes 10, 30, and 50 are folded as substantially a straight piece (FIG. 5). In other words, the collapsed stroller has a more flat shape and a minimum storage space.

Figure 3:
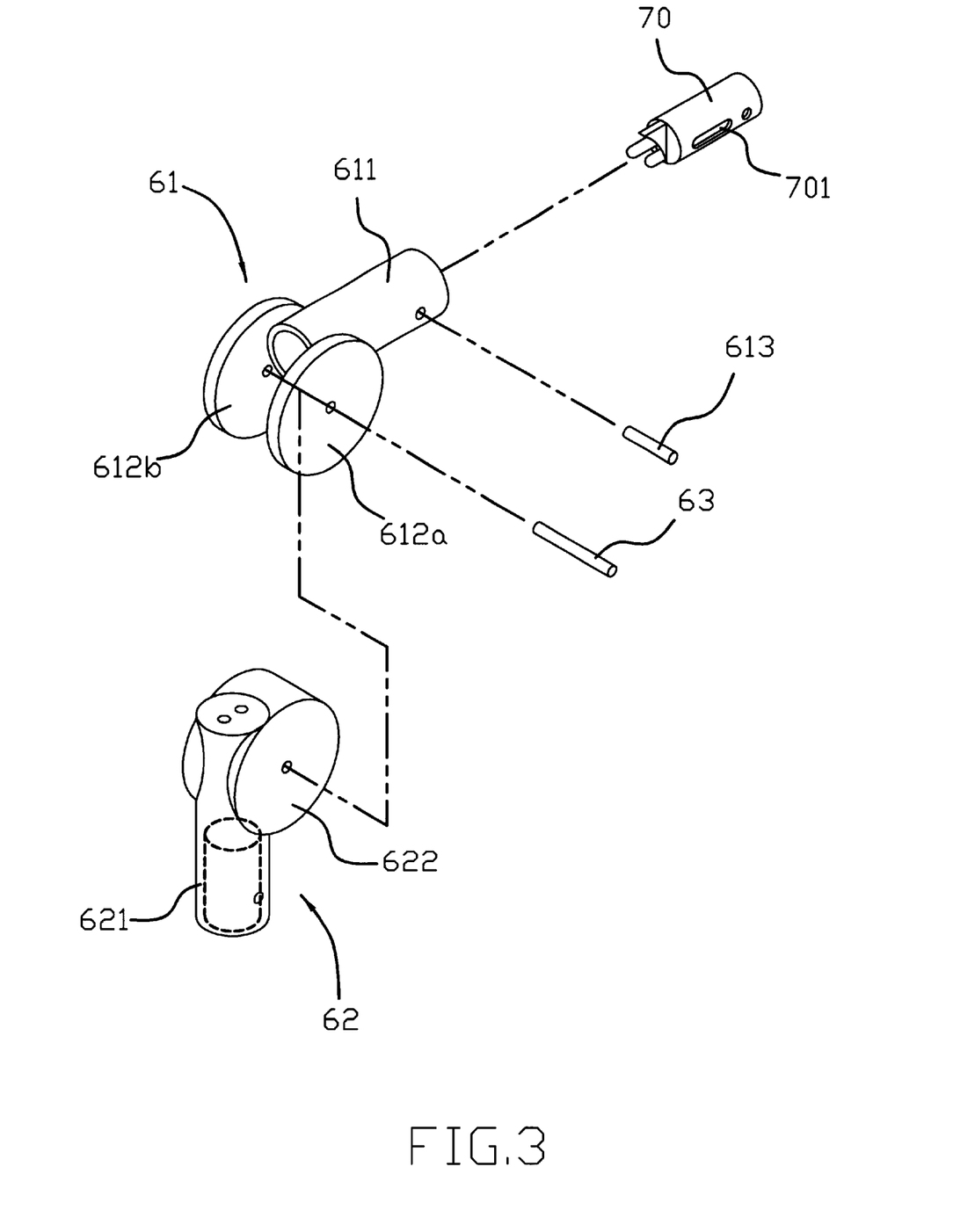
FIG. 3 is an exploded view of the latch shown in FIG. 2.

Referring to FIGS. 3, 4A, and 4B specifically, latch 60 comprises an upper latch 61 fixed to upper tube 501 and a lower latch 62 fixed to lower tube 502. Upper latch 61 includes a pair of spaced first ear members 612a, 612b and a first joint 611 having one end fixed to ear members 612a, 612b. First joint 611 is fixed to the lower end of upper tube 501 in the embodiment. In other embodiments, it is possible for first joint 611 formed as sleeve put on the upper tube 501. Then user fasteners (e.g., bolts or rivets) to secure first joint 611 to the upper tube 501. Preferably, each of first ear members 612a, 612b is a disc. Lower latch 62 includes a second joint 621 similar to first joint 611 of upper latch 61 and a second ear member 622 concentric with first ear members 612a, 612b. A pin 63 is inserted through the center holes of ear members 612a, 622, and 612b to pivotally secure them together. Preferably, the center holes of ear members 612a, 622, and 612b are passed through (or near) the peripheries of first joint 611 and second joint 621 such that upper tube 501 and lower tube 502 may be folded toward each other as substantially a straight piece.

The lower part of locking device 70 is slidable in the bore of first joint 611. An elongate groove 701 is provided on either side of the lower part of locking device 70. As such, a pin 613 may be inserted through the top holes of first joint 611 and grooves 701 to slidably secure first joint 611 and locking device 70 together. As such, locking device 70 is capable of moving into engagement with latch 60 (i.e., locked) as shown in FIG. 4A or moving out of engagement with latch 60 (i.e., unlocked) as shown in FIG. 4B. As shown in FIG. 4A, two pegs are on the underside of locking device 70. These pegs are inserted into two holes on the t op of second joint 621 of lower latch 62, thus securing upper latch 61 to lower latch 62. These holes on lower latch 62 are shown in FIG. 3. At this position, upper tube 501 and lower tube 502 are restrained from folding. In contrast as shown in FIG. 4B, the pegs on the underside of locking device 70 are cleared from the lower latch 62, thus disengaging upper latch 61 from lower latch 62. In other words, the pegs are removed from the holes of the second joint 621 as seen in FIG. 3. At this position, upper tube 501 and lower tube 502 are foldable toward each other as substantially a straight piece.

Trigger member 72 is sleeve-like member slidably put on upper tube 501. Trigger member 72 comprises an external finger tab 720 such that user may activate it to press down or pull up the trigger member 72 and an internal elastic member (e.g., spring or rubber band) 73 having one end anchored to upper tube 501 and the other end anchored to trigger member 72. Trigger member 72 is coupled to locking device 70 through a connecting member (e.g., steel cable or connecting rod) 71. In the unfolded use position as shown in FIG. 4A, elastic member 73 is not biased so as to maintain locking device 70 in a locked state. In contrast, user may pull up the finger tab 720 (i.e., elastic member 73 is compressed) to disengage locking device 70 from latch 60 as shown in FIG. 4B. Hence, stroller is capable of folding.

Figure 4C:
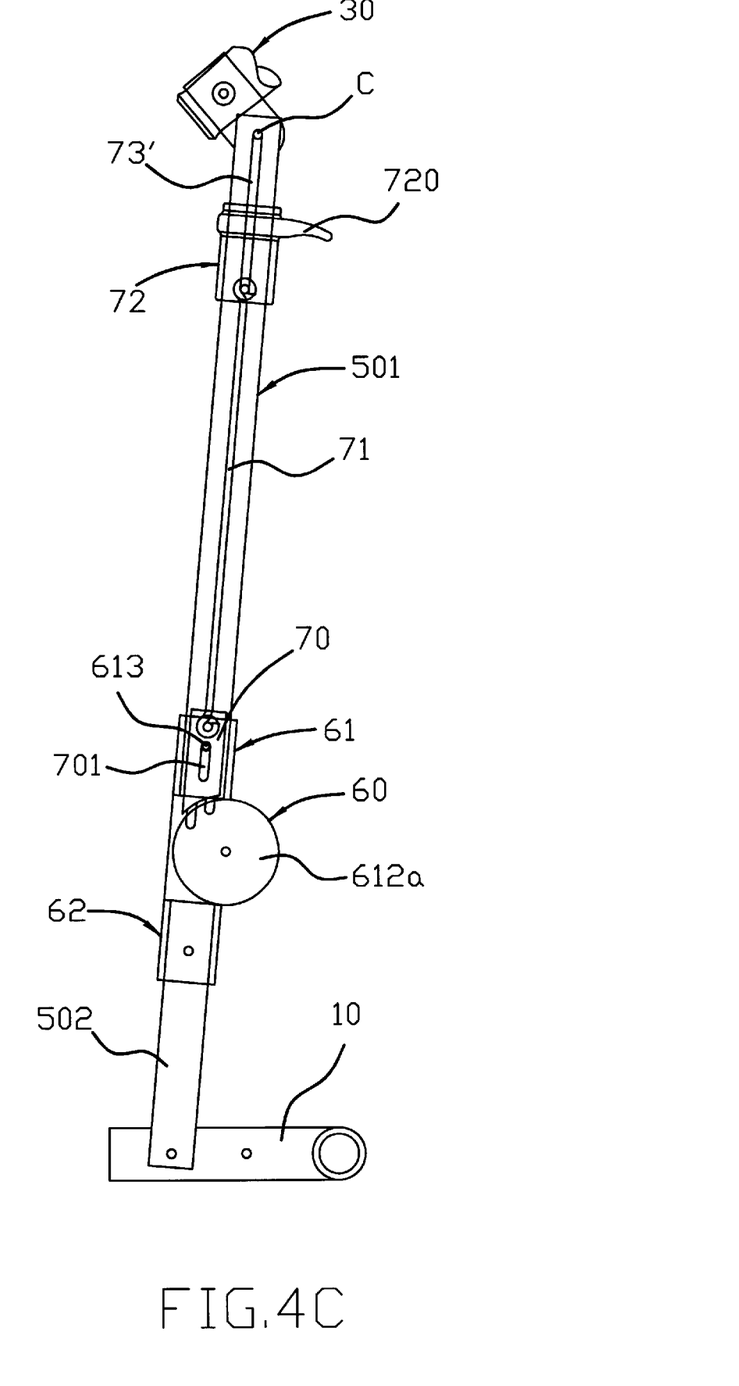
FIG. 4C is similar to FIG. 4A but shows a rubber band as an elastic member.

In FIGS. 4A and 4B, this elastic member 73 is shown as a spring. In FIG. 4C, the elastic member 73' is a rubber band.

Figure 6:
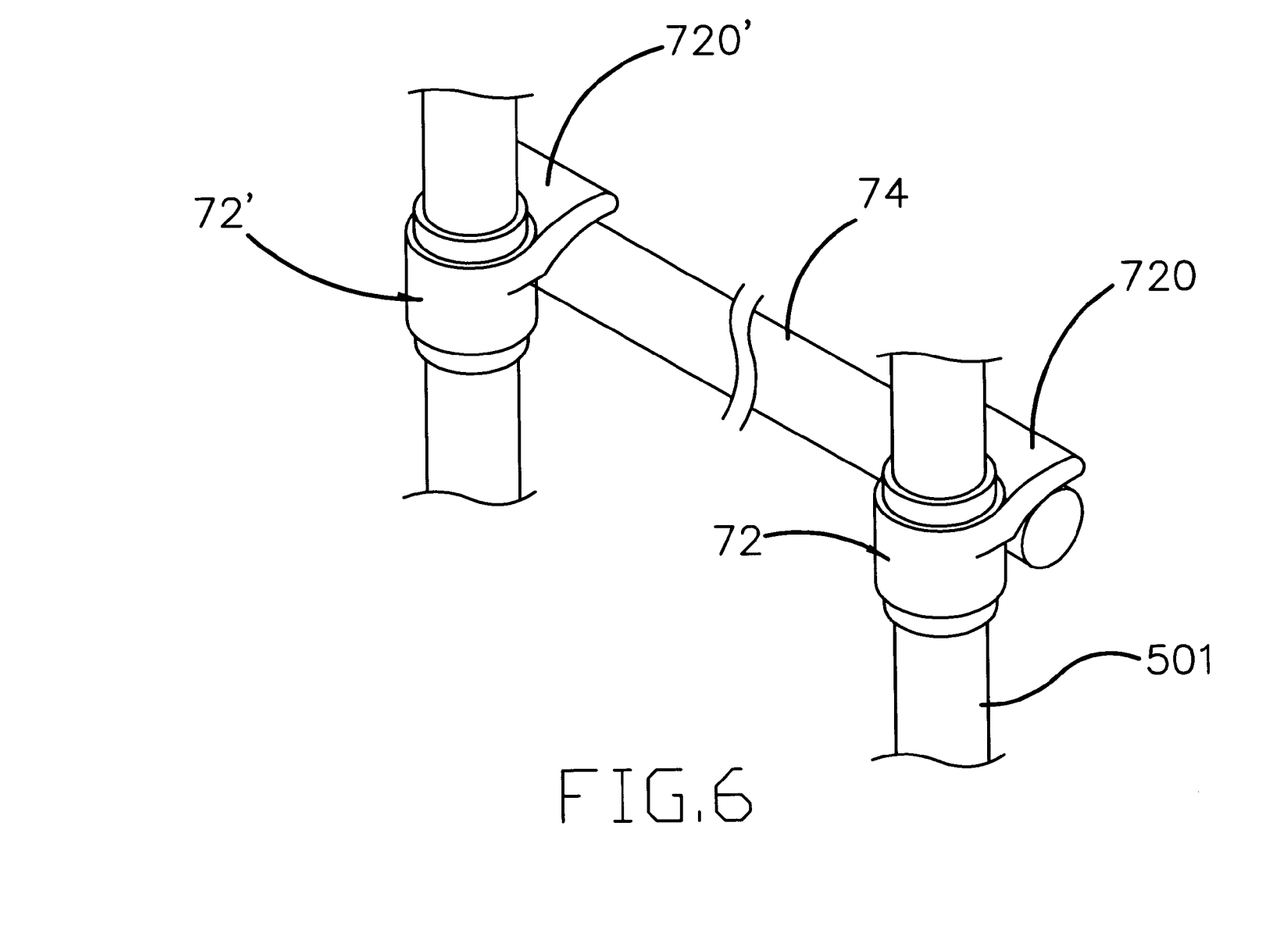
FIG. 6 a schematic perspective view of latch of a second preferred embodiment of collapsible stroller according to the invention for illustrating the feature of being capable of collapsing by a single hand.

Referring to FIG. 6, a latch of a second preferred embodiment of a collapsible stroller according to the invention is shown. Two separate trigger members 72 and two corresponding latches 60 are used in the first embodiment of FIGS. 4A and 4B (i.e., one pair mounted on left sub-frame and the other mounted on right sub-frame). In other words, a user has to manipulate both trigger members 72 for collapsing the stroller through latches 60. While in the second embodiment of FIG. 6, two trigger members 72 and 72' (or finger tabs 720 and 720') are interconnected by a transverse rod 74. Hence, it is possible for a user to manipulate rod 74 by a single hand for effecting the activation of latches 60 through trigger members 72 and 72' and connecting members 71.

Preferably, handlebars 40 are pivotally formed on the top ends of second side tubes 30. As a result, handlebars 40 may be rotated a predetermined angle for further reducing the storage space of the collapsed stroller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A collapsible stroller comprising:
   a frame being substantially a triangle having:
   a first side tube with a front wheel assembly and a rear wheel assembly rotatably mounted thereunder,
   a second side tube having a lower end coupled at a first corner and an upper end formed as handlebar, and
   a third side tube having a lower end coupled to the first side tube at a second corner and an upper end coupled to the second side tube at a third corner,
   wherein the third side tube includes an upper tube and a lower tube pivotally coupled to the upper tube, thereby enabling the second side tube to fold toward the first side tube; and
   a mechanism mounted on the frame including:
   a latch at a joint of the upper tube and the lower tube,
   a locking device slidably provided on the upper tube, the locking device being movable into engagement with the latch or moving out of engagement with the latch, and
   a trigger member slidably put on the upper tube, the trigger member having a connecting member coupled to the locking device,
   wherein the trigger member is operable to cause the locking device to move out of engagement with the latch so as to fold the upper tube toward the lower tube, thereby enabling the second side tube to fold toward the first side tube.

2. The collapsible stroller of claim 1, wherein the triangle shape of the frame is substantially a right-angled triangle.

3. The collapsible stroller of claim 2, wherein the first side tube is formed as the horizontal side of the right-angled triangle.

4. The collapsible stroller of claim 2, wherein the second side tube is formed as the slanted side of the right-angled triangle.

5. The collapsible stroller of claim 1, wherein the handlebar is pivotally formed on the top end of the second side tube such that the handlebars are operable to rotate a predetermined angle for further reducing the storage space of the collapsed stroller.

6. The collapsible stroller of claim 1, wherein the third side tube is formed as the vertical side of the right-angled triangle.

7. The collapsible stroller of claim 1, wherein the upper tube is pivotally coupled to the lower tube at the latch such that the upper tube and the lower tube are either aligned in an unfolded use position of the stroller or folded toward each other in a folded storage position of the stroller.

8. The collapsible stroller of claim 1, wherein the latch comprises an upper latch fixed to the upper tube and a lower latch fixed to the lower tube.

9. The collapsible stroller of claim 8, wherein the upper latch includes a pair of spaced first ear members and a first joint having one end fixed to the first ear members and the other end fixed to the lower end of the upper tube, the lower latch includes a second joint and a second ear member concentric with the first ear members, and further comprising a fastener for pivotally securing the first and the second ear members together.

10. The collapsible stroller of claim 9, wherein the first joint is a sleeve put on the upper tube.

11. The collapsible stroller of claim 9, further comprising a bolt and nut fastener for securing the first joint to the upper tube.

12. The collapsible stroller of claim 9, wherein each of the first and the second ear members is a circular member.

13. The collapsible stroller of claim 9, wherein the locking device comprises an elongate groove on either side of the lower part, and further comprising a second fastener inserted through the first joint and the grooves to slidably secure the first joint and the locking device together such that the locking device is capable of either moving into engagement with the latch or moving out of engagement with the latch.

14. The collapsible stroller of claim 9, wherein the underside of the locking device is operable to either insert into the top of the second joint of the lower latch, thus securing the upper latch to lower latch for restraining the upper tube from folding toward the lower tube, or clear from the top of the second joint of the lower latch, thus disengaging the upper latch from the lower latch.

15. The collapsible stroller of claim 1, wherein the trigger member is sleeve member slidably put on the upper tube and the trigger member comprises an external finger tab being operable to activate the pulling or pressing of the trigger member.

16. The collapsible stroller of claim 1, wherein the trigger member further comprises an internal elastic member having one end anchored to the upper tube and the other end anchored to the trigger member, the elastic member being operable to be not biased for maintaining the locking device in a locked state in the unfolded use position of the stroller or compressed for disengaging the locking device from the latch in the folded storage position of the stroller.

17. The collapsible stroller of claim 16, wherein the elastic member is a spring.

18. The collapsible stroller of claim 16, wherein the elastic member is a rubber band.

19. The collapsible stroller of claim 1, wherein the connecting member is a steel cable.

20. The collapsible stroller of claim 1, wherein the connecting member is a connecting rod.

21. The collapsible stroller of claim 15, wherein the frame includes a left sub-frame and a right sub-frame each with one of the mechanisms including the trigger member, the stroller further comprising a transverse rod for interconnecting the trigger member on the left sub-frame and the trigger member on the right sub-frame such that the locking devices are capable of effecting the locking of the latches through the trigger members and the connecting members during a single operation.

* * * * *